United States Patent [19]
Stierlin et al.

[11] Patent Number: 5,325,684
[45] Date of Patent: Jul. 5, 1994

[54] ABSORBER FOR A DIFFUSION ABSORPTION PLANT

[75] Inventors: Hans Stierlin, c/o DAWP-Greatherm AG, Münchwiesen 5, 8952 Schlieren, Switzerland; John R. Ferguson, Hemel Hempstead, Great Britain

[73] Assignee: Hans Stierlin, Switzerland

[21] Appl. No.: 598,710

[22] PCT Filed: Mar. 14, 1990

[86] PCT No.: PCT/CH90/00067
§ 371 Date: Jul. 15, 1991
§ 102(e) Date: Jul. 15, 1991

[87] PCT Pub. No.: WO90/10835
PCT Pub. Date: Sep. 20, 1990

[30] Foreign Application Priority Data
Mar. 14, 1989 [CH] Switzerland ............... 934/89

[51] Int. Cl.⁵ ............... F25B 37/00; B01D 53/18; F28D 7/02
[52] U.S. Cl. ............... 62/487; 62/476
[58] Field of Search ............... 62/476, 101, 487, 488, 62/491, 494

[56] References Cited

U.S. PATENT DOCUMENTS

| | | | |
|---|---|---|---|
| 1,979,482 | 11/1934 | Kohler | 62/487 |
| 1,993,518 | 3/1935 | Maluri | 62/494 |
| 2,583,769 | 1/1952 | Gaugler | 62/491 |
| 4,127,009 | 11/1978 | Phillips | 62/101 |
| 4,193,268 | 3/1980 | Phillips | 62/101 |

Primary Examiner—Henry A. Bennett
Assistant Examiner—William C. Doerrler
Attorney, Agent, or Firm—Barnes & Thornburg

[57] ABSTRACT

The absorber has four concentric helical conduits in a housing. A dummy tube is arranged in the housing. The weak coolant solution is conducted in four partial flows through four supply lines to the helical conduits. The profiles of the tube of the helical conduits are of flat oval construction. To ensure that the weak solution is uniformly distributed, on the other hand the individual coils of the helical conduits form a gap in which the solution collects, is conducted downward and redistributed. The heat generated in the absorber is dissipated by a liquid in a secondary system which flows inside the helical conduits.

12 Claims, 3 Drawing Sheets

ABSORBER FOR A DIFFUSION ABSORPTION PLANT

BACKGROUND OF THE INVENTION

1. Field of the Invention

The present invention relates to an absorber for a diffusion absorption plant.

2. Description of the Prior Art

Diffusion absorption plants are for a long time known as small refrigeration plants for use in domestic refrigerators. The absorption refrigeration plants have decisively been improved regarding their efficiency. Such an apparatus is extensively described e.g. in the Swiss Patent No. 475 527. These apparatuses have, however, a relatively small output. Therefore, they are not suitable for larger refrigeration plants, e.g. for an air conditioning or for the use as heat pumps in heating plants. In these plants ammonia and water are used as pairs of material, whereby water represents the absorbing material and ammonia the refrigerant. Generally, hydrogen or helium is used as pressure equalizing auxiliary gas. Absorbers in plants which must bring a high output must be in a position to absorb the hereto necessary large amounts of refrigerants and to transfer the heat of the absorption with as little as possible losses of the medium to be heated. In the known diffusion absorption plants of low output the heat of the absorption is transferred to the environmental air. In case of large plants this is as a rule not possible or undesired, the heat of absorption shall rather be disposed of by means of a secondary system with a liquid medium.

SUMMARY OF THE INVENTION

Object of the present invention is, therefore, to provide an absorber for a large output diffusion plant.

This object is reached by means of an absorber of the kind mentioned above in that a tube coil is located in a cylindrical housing, of which the surface is capillary active, whereby the individual windings of the tube coil are at a distance from each other.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
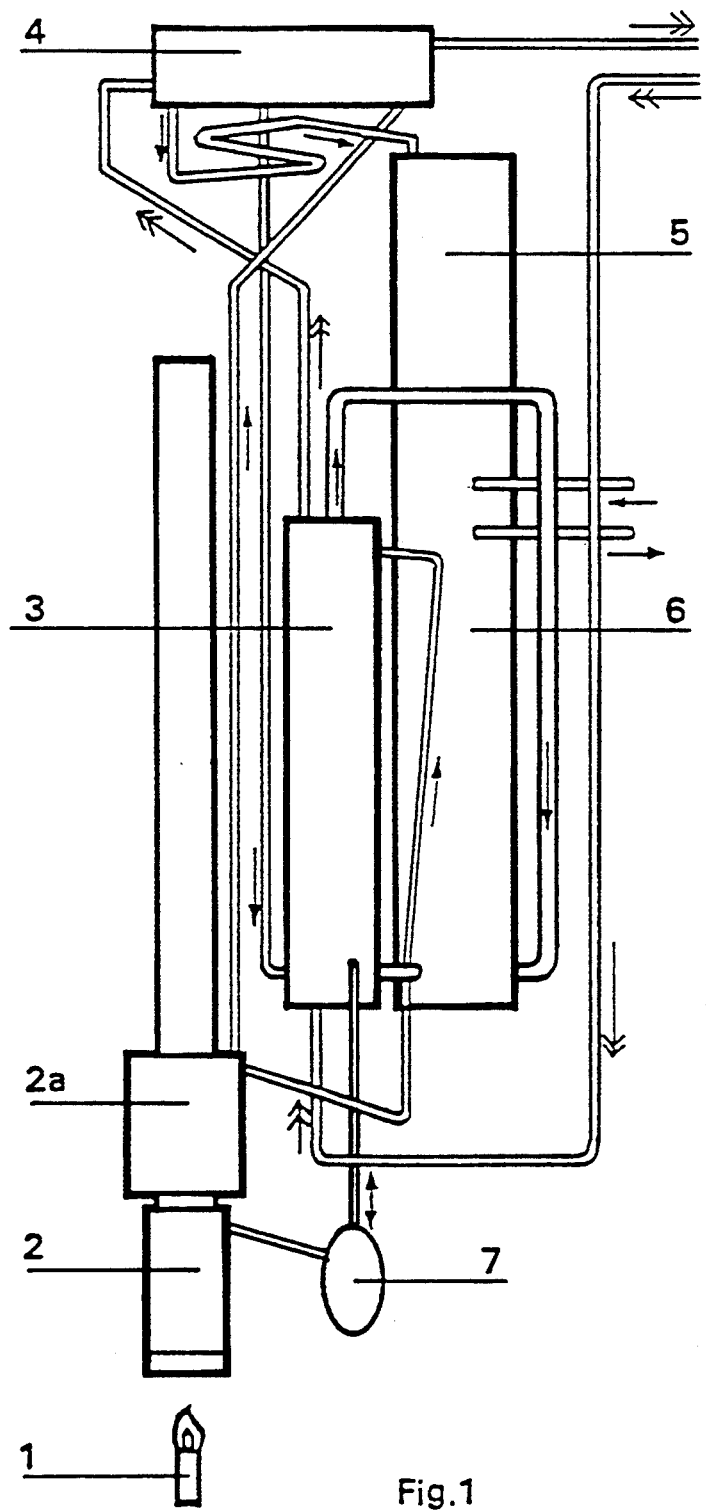
FIG. 1 is a schematic illustration of a large output diffusion absorption plant.

In FIG. 1 the scheme of a large output diffusion absorption plant is illustrated. Such an apparatus includes a gas burner 1 or other heat source, an expeller with a gas-bubble pump 2, in which the refrigerant vapor is expelled. This vapor arrives via a triple heat exchanger 2a through a vapor conduit in the condenser 4. Here the refrigerant vapor condenses and the condensate flows through a condensate conduit into an evaporater 5 where it evaporates at an absorbing of heat. The auxiliary gas which has grown rich due to the evaporation flows into a gas heat exchanger 6 and cools the weak gas flowing thereinto. The rich gas flows afterwards into an absorber 3, where a part of the refrigerant vapor is absorbed by the weak solution. The solution which has grown rich due to the absorption arrives via the triple heat exchanger in the expeller. The refrigerant is here expelled such as described and the solution which due to such has grown weak is pumped upwards by the gas-bubble pump and is accordingly enabled to flow on top into the absorber, whereby ahead of this the weak solution is also led through the triple heat exchanger 2a. The medium of a secondary system flows through the absorber 3 and the condenser 4 which absorbs there heat at a high temperature level. The medium of a further secondary system flows through the evaporator 5 which transfers heat to this medium at a low temperature level.

Figure 2:
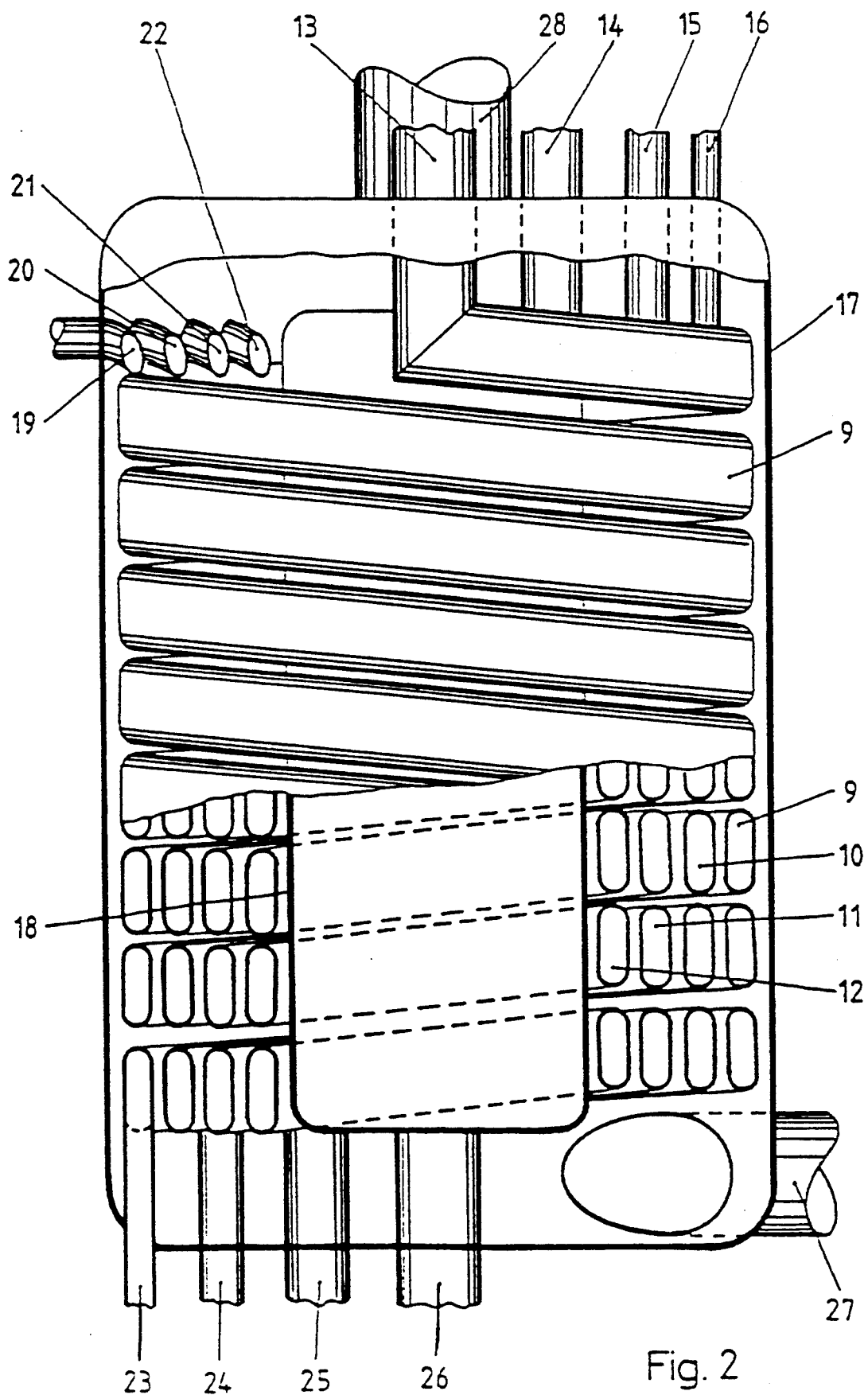
FIG. 2 is a partly cut open partial view of an absorber.
Figure 3:
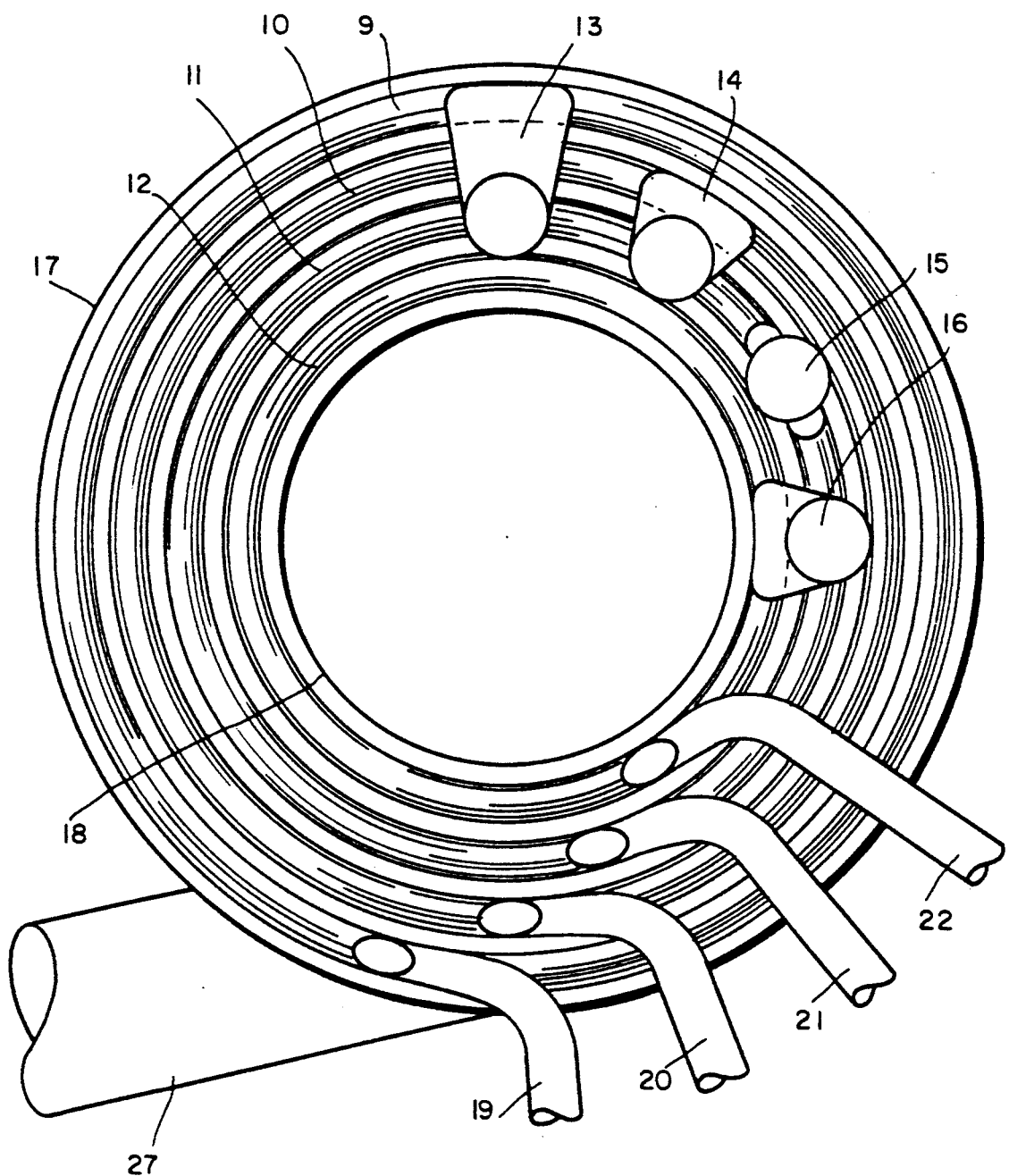
FIG. 3 is a top view of an absorber according to FIG. 2.

An absorber is illustrated in FIG. 2. This absorber consists of four coaxially arranged tube coils 9 to 12, whereby the outermost coil 9 is visible and the inner coils 10 to 12 can be recognized in cross section in the cut-open part of the drawing. FIG. 3 illustrates the coaxial arrangement in a top view from above. The liquid of a secondary system which extracts heat from the absorber flows inside of the tubes of these tube coils 9 to 12. The feeding of the liquid of the secondary system proceeds parallel through inlets 23 to 26 and is withdrawn and the end of the four tube coils through four outlets 13 to 16. The tube coils 9 to 12 are located in a cylindrical housing 17 which includes at its inside a dummy tube 18. The dummy tube 18 and the housing 17 are fixedly mounted on the top and at the bottom to a respective cover, whereby the dummy tube is open against the environment such that atmospheric pressure prevails inside the dummy tube. The auxiliary gas used in the diffusion absorption heat pump is fed in by means of a gas inlet tube 27 and flows through the space defined by the dummy tube 18 and the housing 17 along the outer surfaces of the tube coils at a countercurrent relative to the weak solution upwards and leaves the absorber through a gas outlet tube 28. The weak solution, here an aqueous ammonia solution, exits the expeller and is divided into four stream portions in order to be fed to the absorber by supply lines 19 to 22. These supply lines 19 to 22 are arranged such in the upper part of the absorber that the weak solution is individually fed by the respective supply lines 19 to 22 to the individual tube coils (FIG. 3).

The tubes of the tube coils 9 to 12 have a flat oval cross section. It can be seen in the cut-open part of FIG. 2. This cross-sectional shape has in many respects considerable advantages over the otherwise customary circular cross sections. Namely, on the one hand the heat transfer of the liquid of the secondary system is considerably improved by the shape factor. The flatter the tube profile is the better the heat transfer will be. A flattening of the tube profile increases, however, the pressure loss which occurs in the tubes when the liquid flows therethrough. It has been proven that a profile having an inner clearing of 4 millimeters is the most advantageous regarding the improvement of the heat transfer at a still acceptable pressure loss.

The flat profile of the tube coils has however, on the other hand, positive effects regarding an even distribution of the refrigerant solution over the entire tube surface, a demand which must be met for a productive absorber. The auxiliary gas stemming from the evaporator reaches the absorber and is absorbed by the weak solution. The heat energy generated by the absorbing is transferred to the medium of the secondary system. The diffusion absorption heat pump illustrated herein displays heatwise an output of about 3 kW, whereby about 1 kW stems from the evaporation output of the evaporator. In order to achieve such a high output is it necessary that a large surface in the absorber is wetted by a weak solution such that it is possible to transfer a sufficient amount of heat energy to the medium of the secondary system. In the described exemplary embodiment this surface is provided by four concentrically arranged tube coils. In order to allow the absorption to prevail uniformly over the entire surface area, it is necessary that every location of the tube is continuously supplied by refrigerant solution. Substantially two measures serve thereto. On the one hand the individual windings of the tube coils are located at a distance to each other, such as can be seen in FIG. 2. In the slit formed by this distance the refrigerant solution can accumulate due to its surface tension and flow spirally downwards, whereby continuously a part of the refrigerant solution is always again distributed practically vertically downwards over the tube surface and mixes again in the slit formed by the next following winding with the solution present there. The uppermost winding of each tube coil has a larger distance and forms therefore a larger slit. This ensures a very rapid wetting of the entire radial circumference of a tube coil by the refrigerant solution which enters through the inlets 19 to 22. On the other hand the surface of the tube coils must be structured such that a uniform wetting occurs. In the embodiment this is achieved in that the tubes are equipped with a knurl-like cross profile, a so-called knurling. With such a profile attention must be paid that the individual notches are continuous and are not closed off at the intersections by the notches extending laterally thereto. This secures an extremely good wetting of the entire tube surfaces by a thin refrigerant layer. Additionally, this knurling increases the surface of the tubes. The solution is sort of interwhirled on the tube surfaces.

The tube surface can also be knurled in a different fashion, decisive is its capillary effect. The tubes may be, for instance, equipped with grooves extending in a close spiral form therearound.

The distance between the concentrically arranged tube coils is to be kept as small as possible. Also the distance between the outermost tube coil 9 and the cylindrical housing 17 and the innermost tube coil 12 and the dummy tube 18. This because the rich auxiliary gas flows through the slits formed by these distances. The smaller this space is, the more effective is the diffusion of the ammonia out of the gas (FIG. 2). However, these interstices cannot be arbitrarily small because a too high pressure loss for the auxiliary gas flowing therethrough would arise which would prevent a sufficient circulation of the auxiliary gas in the entire system. The dummy tube 18 arranged in the inside of the absorber has, however, not only the duty to form a small slit necessary for an effective diffusion, it also reduces the volume which is subjected to pressure. This is of a decisive importance for the safety of the apparatus (boiler formula).

Due to their concentric arrangement the tube coils 13 to 16 have variously sized diameters, by means of such the tube surfaces of the individual coils have differing sizes. Care must accordingly be taken that the refrigerant solution is supplied in amounts of various magnitudes to the individual tube coils depending from the surface areas. A distributing device which is switched in between the expeller and the absorber makes this distribution into four differing flow portions of the weak solution. By means of the absorber illustrated by the exemplary embodiment it will be possible to produce diffusion absorption heat plants with sufficient high outputs which are in the position to find use as heat pumps in heating plants or for the purpose of air conditioning.

While there is shown and described a present preferred embodiment of the invention, it is to be distinctly understood that the invention is not limited thereto, but may be otherwise variously embodied and practiced within the scope of the following claims.

We claim:

1. An absorber for a diffusion absorption plant consisting of at least one tube coil extending helically about a vertical axis in a cylindrical housing, the outer surface of said tube coil being capillary active, wherein vertically consecutive windings of said tube coil are spaced apart such that a helical gap containing accumulated refrigerant solution is formed between said consecutive windings.

2. The absorber according to claim 1, in which the profile of the tube of the tube coil is formed as flat-oval.

3. The absorber according to claim 1, in which the distance between the uppermost coil winding and the next following coil winding is larger than that of the distances between the other windings.

4. The absorber according to claim 1, in which a dummy tube is coaxially arranged in the inside of the absorber housing.

5. The absorber according to claim 1, in which one or a plurality of more tube coils are foreseen in the absorber casing which extend coaxially to the first tube coil.

6. The absorber according to claim 1, in which the tube surface of the tube coils is knurled.

7. The absorber according to claim 1 in which the tube surface of the tube coils comprises grooves extending spirally around the tubes.

8. An absorber according to claim 1, wherein the distance between the uppermost coil winding and the next following coil winding is larger than the distances between the other windings.

9. An absorber according to claim 1, wherein a dummy tube is coaxially arranged in the inside of the absorber housing.

10. An absorber according to claim 1, wherein one or a plurality of more tube coils are in the absorber casing which extend coaxially to the first tube coil.

11. An absorber according to claim 1, wherein the tube surface of the tube coils comprises grooves extending spirally around the tubes.

12. An absorber for a diffusion absorption plant consisting of at least one tube coil located in a cylindrical housing, the surface of said tube coil is capillary active, whereby individual windings of the tube coil are at a distance from each other and whereby a dummy tube is coaxially arranged inside said housing.

* * * * *